United States Patent [19]
Terry

[11] 3,760,407
[45] Sept. 18, 1973

[54] P.C.M. CODERS

[75] Inventor: John Brian Terry, Maldon, England
[73] Assignee: The Marconi Company Limited, Chelmsford, Essex, England

[22] Filed: Dec. 10, 1971
[21] Appl. No.: 206,749

[30] Foreign Application Priority Data
Dec. 19, 1970 Great Britain ................60,407/70

[52] U.S. Cl. .......................................... 340/347 NT
[51] Int. Cl. .......................................... H03k 13/02
[58] Field of Search .............................. 340/347 NT

[56] References Cited
UNITED STATES PATENTS
3,480,948 11/1969 Lord ........................... 340/347 NT
3,414,818 12/1968 Reidel ......................... 340/347 NT

*Primary Examiner*—Daryl W. Cook
*Assistant Examiner*—Jeremiah Glassman
*Attorney*—Donald M. Wight et al.

[57] ABSTRACT

To achieve a segmented-law analogue to digital signal conversion, a capacitor is charged by a constant current which changes as the states of the three most significant digits of a binary counter, counting pulses supplied by an oscillator, change. Counting ceases and the count is read out when the capacitor voltage reaches the sampled analogue signal voltage. The constant current is derived from a constant current generator and either three current dividers or three or more further constant current generators which are switched in to or out of circuit as the count changes.

4 Claims, 5 Drawing Figures

P.C.M. CODERS

Figure 1:
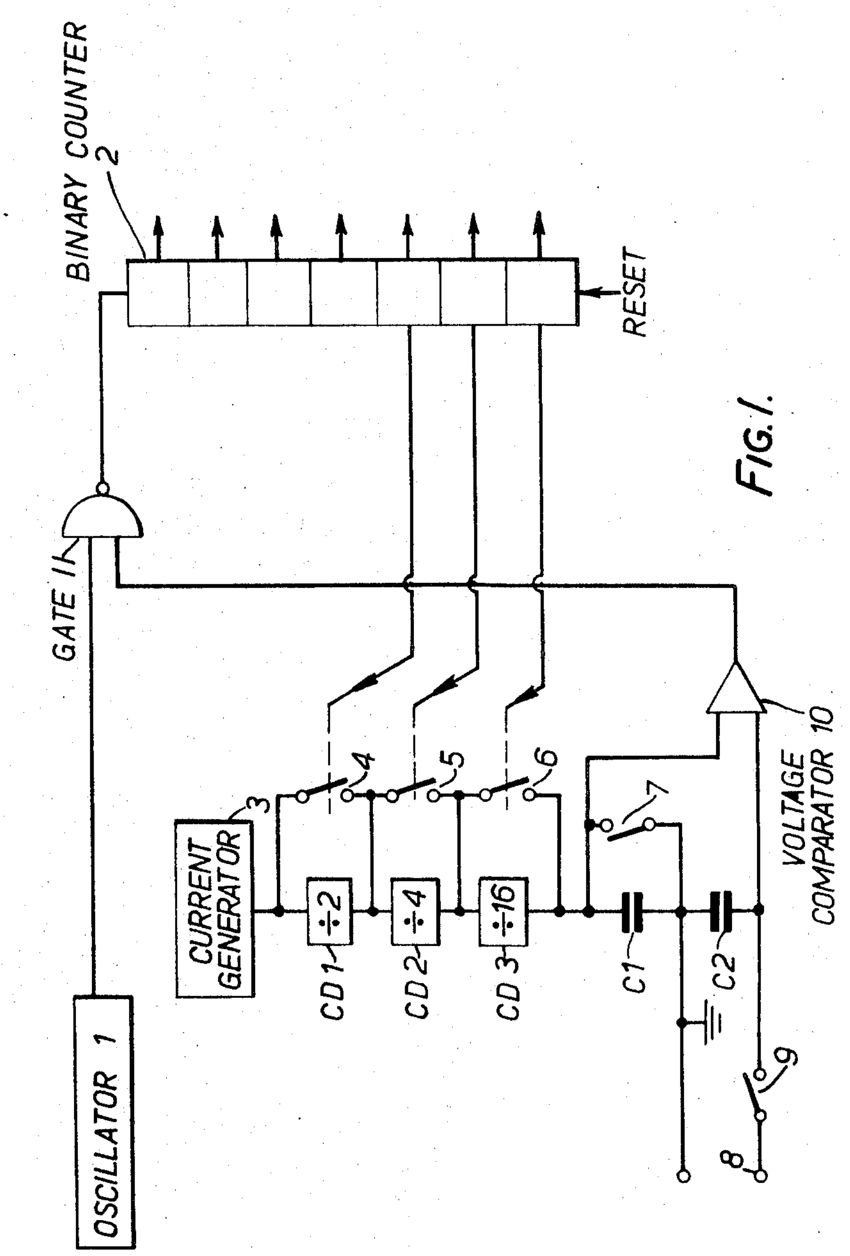

This invention relates to pulse code modulation (P.C.M.) coders, and more particularly to coders which convert an analogue signal to a digital P.C.M. code. In telephone systems speech is usually converted to an analogue signal at the mouth piece of a telephone handset, and it is frequently necessary to convert the analogue signal to a digital signal in order that the signal may be processed by and routed through a P.C.M. telephone exchange. The conversion may take place at the handset or at the exchange, and usually obeys a so-called segmented law. Linear law conversions, in which the amplitude of the analogue signal at a sampling instant is converted to a digital code whose magnitude is linearly proportional to the sampled amplitude, are not wholly satisfactory, and segmented-law conversions are to be preferred. In this case the magnitude of the digital code may for example bear a geometrical relationship with the sampled amplitude. This provides a greater number of digital codes at low analogue signal amplitudes where good coding resolution is required to preserve high fidelity in the transmitted speech, and provides progressively a lesser number of digital codes at higher analogue signal amplitudes where fine coding resolution is not so important. Known coders which operate according to a segmented-law tend to be fairly complex and expensive since for telephone system applications the performance requirements are stringent. The present invention seeks to provide coders which satisfy the performance requirements, but which shall not be of excessive complexity or expense.

According to this invention an analogue to digital coder includes an oscillator; a digital counter which is fed with output from said oscillator; a constant current generator; a capacitor which is recurrently charged by a charging current derived from the said constant current generator; means dependent on the contents of the digital counter for controlling said changing current; means for comparing the amplitude of an analogue signal with the potential existing on the said capacitor at a given instant in time; and means for stopping the said counter when the potential stored on the capacitor is substantially equal to the amplitude of said sampled analogue signal.

The contents of the counter when the potential on the capacitor equals the sampled analogue signal represents the required digital code. If desired the contents of the counter may be serially read out to produce a serial digital code and the counter subsequently reset.

Preferably after the completion of a coding cycle and the said capacitor is discharged, the analogue signal is again sampled and a corresponding digital code produced.

Preferably there is interposed between the oscillator and the digital counter a gate which is closed or opened by a comparator in dependence on whether the sampled analogue signal is equal to or greater than the instantaneous potential stored on the capacitor respectively.

According to one feature of this invention there is interposed between the said constant generator and the said capacitor at least one current divider which is controlled by the contents of the said counter.

Preferably there are three current dividers in connected cascade between the said current generator and the said capacitor; each current divider being by-passed by a switch each of which is activated by one bit of the digital counter.

Preferably again the values of the current divisors are two, four and sixteen the current dividers being activated by the third significant digit, the second significant digit and the most significant digit respectively of the digital counter.

According to a second feature of this invention a plurality of constant current generators are provided whose outputs may be selectively combined in dependence on the contents of said digital counter; and the said combined output current of which is arranged to recurrently charge the said capacitor.

Preferably there is provided a shift register interposed between the said digital counter and the said plurality of constant current generators wherein the shift register is provided with a plurality of storage elements each one of which controls directly one of said constant current generators.

Preferably again the said constant current generators are sequentially controlled to provide a combined output current which obeys a geometrical segmented-law.

Preferably eight constant current generators are provided.

According to a third feature of this invention there is provided a plurality of constant current generators whose output current may be selectively combined in dependence on the contents of the said digital counter; and a frequency divider positioned between the said oscillator and the digital counter which is also controlled in dependence on the contents of the said digital counter.

Preferably in an embodiment as described immediately above there are provided four constant current generators having pre-determined output currents, and which are controlled in dependence on the contents of the two most significant bits in the digital counter, and the said divider is adapted to divide the frequency by a factor of two and is controlled by the third most significant bit in the digital counter.

Preferably the four constant current generators provide currents having relative magnitudes of unity, three, 12 and 48.

Preferably again the frequency divider and the four current generators are controlled by the binary counter to provide as an output from the binary counter a digital code which is related to the analogue signal by a geometrical segmented-law.

Figure 2:
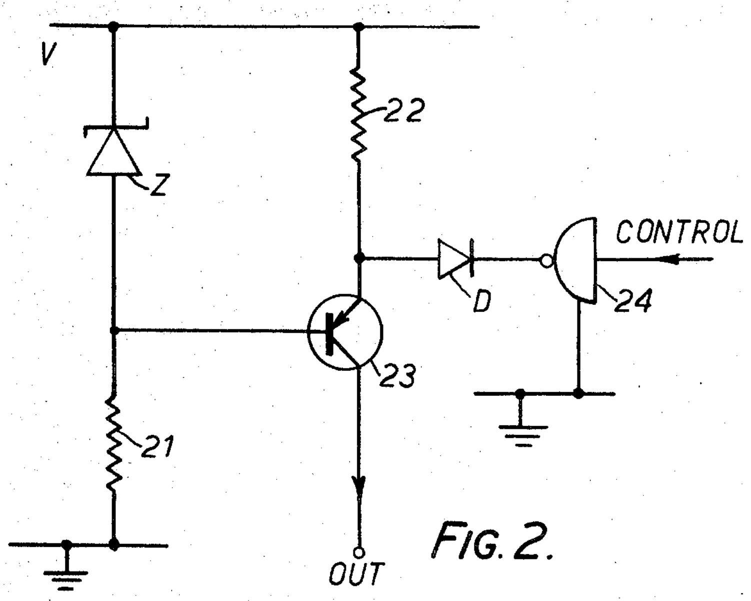
Figure 3:
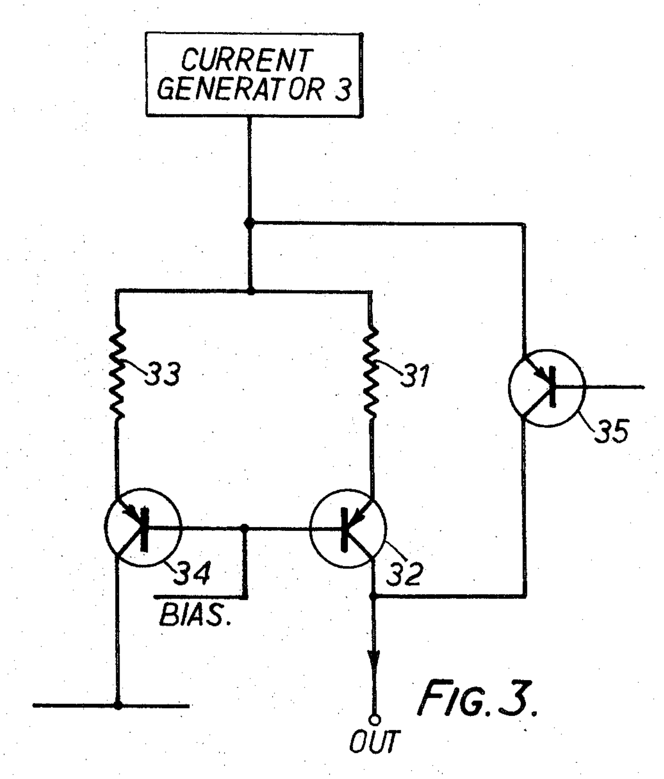
Figure 4:
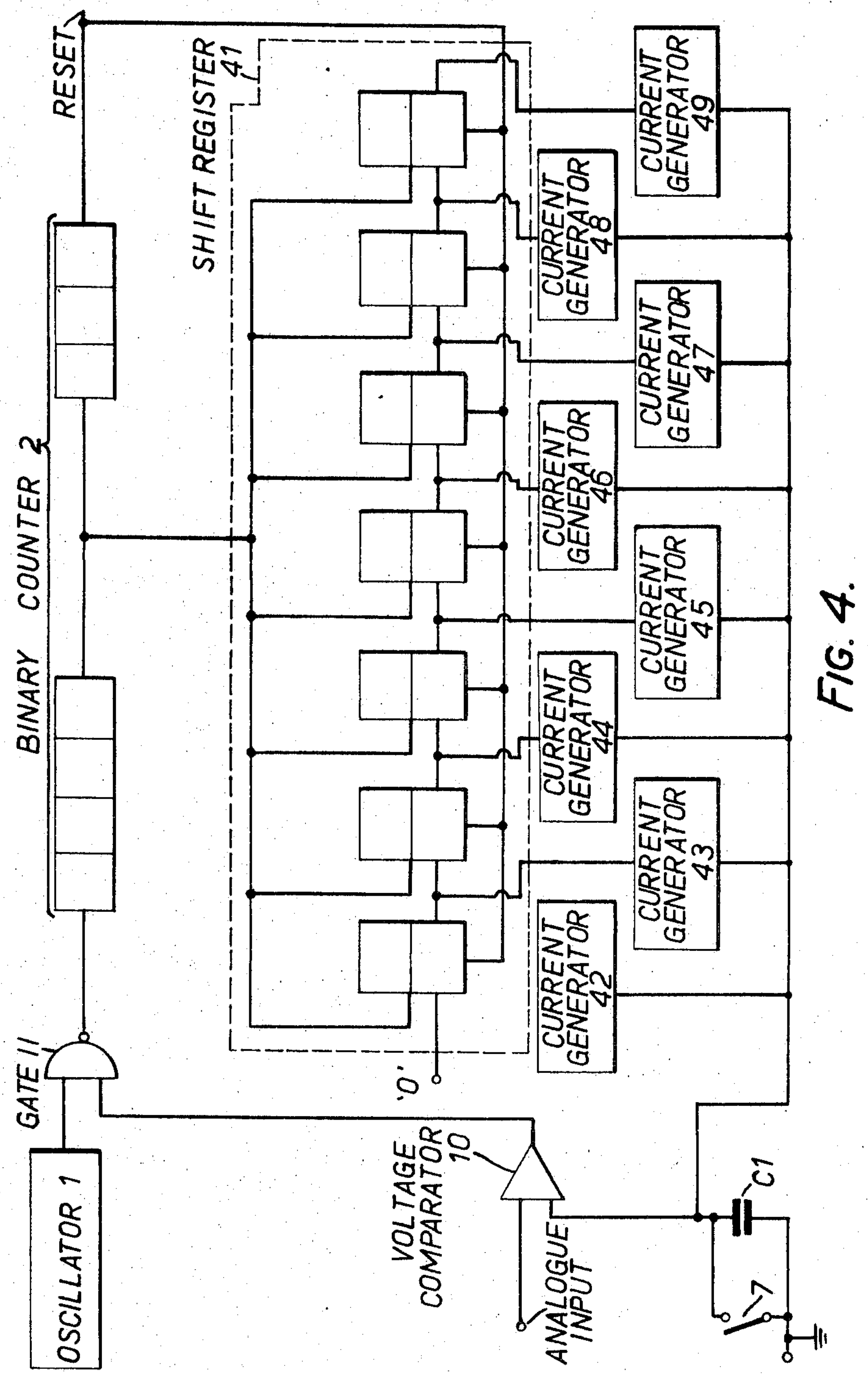
Figure 5:
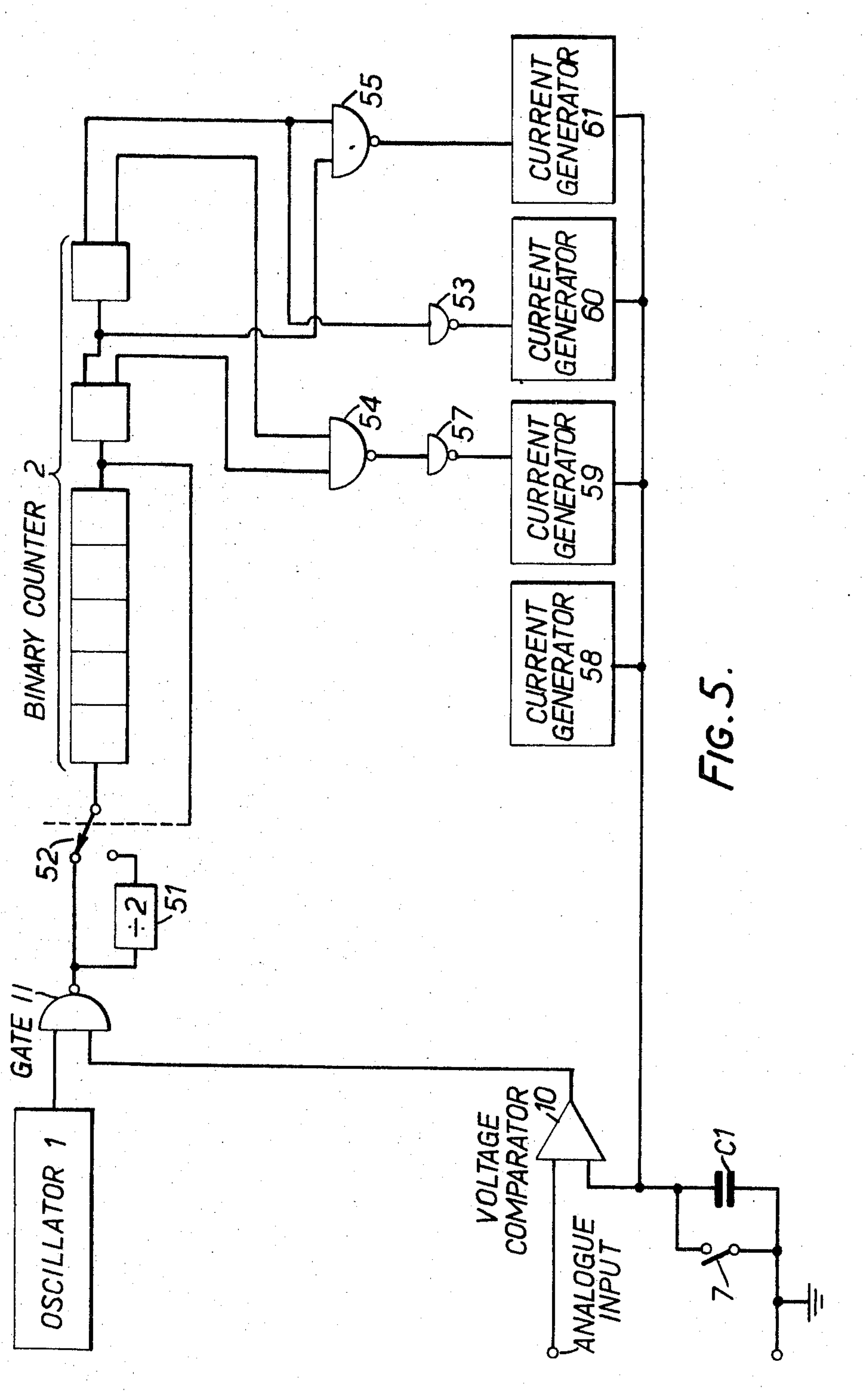

The invention will be further described by way of example with reference to the accompanying drawings in which FIGS. 1, 4 and 5 each represent coders in accordance with this invention, and FIGS. 2 and 3 are provided for purposes of illustration.

FIG. 1 shows an oscillator 1 which feeds a digital counter 2. The counter consists of a series of cascaded bistables and will therefore be referred to as a binary counter. The binary counter 2 is a seven digit counter and may for example be provided by two integrated circuits type Fairchild MSI 9316. A constant current generator 3 provides an output current which is used to recurrently charge a capacitor C1 via three current dividers CD1, CD2 and CD3. Each of the current dividers CD1, CD2 and CD3 has the divisor value shown and may be by-passed by a short-circuiting switch 4, 5 or 6. These switches are controlled by the three most significant digits in the binary counter 2. The capacitor C1 is provided with a short-circuiting switch 7 which may be closed to discharge it. An analogue signal is applied to a terminal 8 and is periodically sampled by the monentary closing of a switch 9 to charge a capacitor C2 to the amplitude of the sampled voltage. The sampled analogue signal is also applied to one input of a voltage comparator 10, the other input of which is applied to one side of the capacitor C1 as shown. The voltage comparator may be for example an integrated ciruit type Fairchild μ A710. The output of the voltage comparator 10 is fed to one input of a dual input NAND gate 11 which is interposed between the oscillator 1 and the binary counter 2. The NAND gate 11 may be type Fairchild DT μL 9946.

The current generator 3 is shown in more detail in FIG. 2. A Zener diode Z and a resistor 21 are connected in series in that order betwen a positive supply voltage V and a reference voltage level, which may be earth. The junction point of the Zener diode Z and the resistor 21 is connected to the base of a p.n.p. transistor 23, the emitter of which is connected via a resistor 22 to the voltage V, and the collector of which is connected to an output terminal OUT to which a constant current is supplied. The current generator 3 is controlled by a diode D, poled as shown, connected between the emitter of transistor 23 and the output of a NAND gate 24. A logical 1 level signal applied to an input of the NAND gate provides a low impedance current path from the resistor 22 to earth through the NAND gate and consequently under this circumstance transistor 23 is rendered non-conductive as the emitter voltage approaches earth potential.

The current dividers CD1, CD2 and CD3 may take the form shown in FIG. 3 in which the current generator 3 is connected via a resistor 31 to the emitter of a p.n.p. transistor 32, and also via a resistor 33 to the emitter of a further p.n.p. transistor 34. The collector of transistor 34 is connected to earth, and the collector of transistor 32 is connected to an output terminal OUT at which is provided the divided current. The bases of each of the transistors 32 and 34 are connected together and to a source of bias voltage. The transistors 32 and 34 are a matched pair and the bias voltage causes identical voltage to exist on the emitter terminals of each. The collector current of each is therefore proportional to the conductance of the resistors 31 and 33. If therefore the conductance of the resistors 31 and 33 are made equal, the output current will be exactly half of the current supplied by the current generator 3.

The divider circuit is controlled by the p.n.p transistor 35. In its non-conductive state, the divider circuit operates normally, but when transistor 35 is made conductive the whole of the current by-passes transistors 32 and 34 and is applied to the output terminal OUT. In this condition the emitter voltages of transistors 32 and 34 will decrease, and bias these transistors into their non-conductive states. Thus only leakage currents will flow through resistors 31 and 33 and these are assumed to be sufficiently small as to be negligible for practical purposes. Thus the divider is short-circuited by the application of a logical 0 level to the base of transistor 35.

The operation of the coder of FIG. 1 is as follows. Switch 9 is closed momentarily and capacitor C2 is charged to the voltage of the amplitude of the sampled analogue signal. The input impedance of the voltage comparator 10 is very high, and it is assumed that the voltage on capacitor C2 remains substantially constant between sampling intervals. Capacitor C1 is assumed to be initially discharged and the relative voltages on the inputs of the voltage comparator 10 causes an output signal from the voltage comparator 10 which opens gate 11 and allows pulses from the oscillator 1 to be fed to the binary counter 2. Initially all three current dividers CD1, CD2 and CD3 are in circuit and the output from the current generator 3 is divided by the maximum amount, i.e. 2 × 4 × 16 which equals 128 so that the capacitor C1 charges slowly. The binary counter, which initially reads zero, or in other words contains a logical 0 level in each bit digit (which according to the convention herein adopted is substantially earth potential), counts the pulses from the oscillator 1 and when a logical 1 level appears in the third most significant digit bit switch 4 is opened since each of the switches 4, 5 and 6 is opened by a logical 1 level.

As the binary counter 2 continues to fill up, the dividers CD1, CD2 and CD3 are switched in and out of circuit, the current which reaches the capacitor C1 doubling the value each time, until finally the whole current is used. If this final stage is reached then the resulting binary code in the binary counter 2 represents the maximum possible amplitude of an analogue signal that can be converted into a digital code. In general however this stage may not be reached since when the voltage stored on the capacitor C1 equals or exceeds the stored analogue signal on capacitor C2, the output signal from the voltage comparator 10 reverses, and gate 11 is closed.

Since at each operation of the dividers CD1, CD2 and CD3 the current charging the capacitor C1 progressively increases, the rate of voltage rise on the capacitor also increases for a given number of output pulses from the oscillator 1, and segmented-law for the conversion of the sampled analogue signal to a digital code is produced.

When gate 11 is closed the contents of the binary counter 2 may be read out, serialised (by means not shown) and utilised as desired. The counter is then reset and the capacitor C1 discharged. The coding cycle is then repeated for subsequent sampled values of the analogue signal.

FIG. 4 shows an alternative arrangement which dispenses with the need to provide cascaded current dividers, which require a high operating voltage (about 30 volts). The arrangement shows operates on low voltages, and differs primarily from that shown in FIG. 1 in the way the value of the charging current for capacitor C1 is altered. The sampling arrangement comprising capacitor C2 and switch 9 is omitted from this drawing for the sake of clarity but would take the same form as is shown in FIG. 1.

An output is taken from the binary counter 2 at the input to the third most significant bit, and is used as a clock line input to a seven-bit shift register 41 (shown within the broken line) and which may for example consist of seven bistables type Fairchild DT μ L9948. The input of the first bit of shift register 41 is connected to a logical 0 level which is clocked from bit to bit of the register by the clock pulses derived from the binary counter 2. The output from each bit of the shift register 41 is connected to the control terminal of a current generator 43 to 49 of the kind described with reference to FIG. 2. The outputs from the current generators 43 to 49 are connected together, to the output of a further current generator 42, and to the capacitor C1. If I is the maximum charging current obtainable, the current generators 42 to 49 provide output amounts of I/128; I/128; I/64; I/32; I/16; I/8; I/4 and I/2 respectively.

The operation of the coder shown in FIG. 4 is as follows. As with the coder of FIG. 1, an element of the analogue signal is sampled and stored on capacitor C1, and at the same time gate 11 is opened to allow the passage of pulses from the oscillator 1 to the binary counter 2.

When the pulses reach the input of the third most significant bit of the binary counter 2, alterations in the logical level from a 1 to a 0 level and vice versa are used to clock logical 0 levels through the shift register 41. Each current generator 43 to 49 is turned on by the presence of a logical 0 level on its control input, and hence the charging current for capacitor C1 is progressively increased cumulatively. Since each current generator provides a current which has twice the value of the generator on its left except for the left-most two which have the same value, a segmented-law identical to that produced by the coder of FIG. 1 is obtained.

FIG. 5 shows a modified coder which requires only four current generators and replaces the shift register with simpler logic elements.

Interposed between the gate 11 and the binary counter 2 is a frequency or pulse rate divider 51, which may be by-passed by a switch 52. The output from the third most significant bit of the binary counter 2 is used to control the switch 52. The inverted output from the second most significant bit of the binary counter 2 is connected to one input of a dual input NAND gate 54, and the non-inverted output to one input of another NAND gate 55. The output from the most significant bit of the binary counter 2 is connected to the other input of the NAND gate 55, and the inverted output is connected directly to the remaining input of the NAND gate 54.

Four current generators are provided, referenced 58 to 61. Current generator 59 is controlled by NAND gate 54 via an inverter 57; current generator 60 is controlled directly by the output of the most significant bit of binary counter 2 via an inverter 53; and current generator 61 is controlled directly by NAND gate 55. Current generator 58 is permanently on.

If I is assumed to be the largest combined current available to charge capacitor C1, then current generator 58 provides current I/128; current generator 59 provides current 3I/128; current generator 60 provides current 12I/128; and current generator 61 current 48I/128. As before, each generator is turned on by the presence of a logical 0 level. The way in which these are combined to produce a geometrical segmented-law will be apparent from the description which follows. Initially divider 51 is connected out of circuit by switch 52, and pulses which occur at the oscillator frequency are fed into the binary counter 2. During this time the current of I/128 from current generator 58 is slowly charging capacitor C1. When a logical 1 level appears at the third most significant bit of the binary counter 2, switch 52 is operated (by means not shown) and divider 51 is connected in circuit, causing the binary counter 2 to count at half speed When a logical 1 level appears in the second most significant bit, a logical 0 level is provided at the inverted output of that bit which is applied to NAND gate 54. The resulting logical 1 level is inverted by inverter 57 and the logical 0 level turns on current generator 59. Simultaneously with the appearance of the logical 1 level in the second most significant bit of the binary counter 2, the third most significant bit reverts to a logical 0 level, and pulses from the oscillator 1 are fed to the binary counter 2. The combined output from current generators 58 and 59 is now I/128 + 3I/128 = 1/32.

Similarly, when a logical 1 level appears in the most significant bit of the binary counter 2, current generator 60 is turned on (since the signal is inverted by inverter 53 to produce the necessary logical 0 level), and simultaneously divider 51 is switched out of circuit, and the combined output current from current generators 58, 59 and 60 becomes I/8. When divider 51 is subsequently switched in, the effective charging current becomes I/4. Finally, current generator 61 is switched on by the presence of a logical 1 in both the first and second most significant bits of the binary counter 2 and the cumulative charging current becomes equal to I. Since in this condition NAND gate 55 provides a logical 0 level output, no inverter has to be inserted to provide correct control of the current generator 61.

Thus a segmented-law is obtained to convert the input analogue signal to a digital code. Clearly by suitable choice of current generators and/or current dividers segmented-laws which are not necessarily geometrical laws may be produced.

I claim:

1. An analogue to digital coder including an oscillator; a digital counter which is fed with output from said oscillator; a constant current generator; a capacitor which is recurrently charged by a charging current derived from the said constant current generator; control means dependent on the contents of the digital counter for controlling said charging current; comparison means for comparing the amplitude of an analogue signal with the potential existing on the said capacitor at a given instant in time; and gating means for stopping the said counter when the potential stored on the capacitor is substantially equal to the amplitude of said sampled analogue signal; a gate interposed between the oscillator and the digital counter which is closed or opened by a comparator in dependence on whether the sampled analogue signal is equal to or greater than the instantaneous potential stored on the capacitor respectively, a plurality of constant current generators whose output current may be selectively combined in dependence on the contents of the said digital counter; and a frequency divider positioned between the said oscillator and the digital counter which is also controlled in dependence on the contents of the said digital counter.

2. A coder as claimed in claim 1 wherein there are provided four constant current generators having predetermined output currents, and which are controlled in dependence on the contents of the two most significant bits in the digital counter, and the said divider is adapted to divide the frequency by a factor of two and is controlled by the third most significant bit in the digital counter.

3. A coder as claimed in claim 2 wherein the four constant current generators provide currents having relative magnitudes of unity, three, 12 and 48.

4. A coder as claimed in claim 3 wherein the frequency divider and the four current generators are controlled by the binary counter to provide as an output from the binary counter a digital code which is related to the analogue signal by a geometrical segmented-law.

* * * * *